United States Patent [19]

Marocco

[11] E Patent Number: Re. 33,216

[45] Reissued Date of Patent: May 15, 1990

[54] BLIND ASSEMBLY

[76] Inventor: Norbert Marocco, 46 Pennygrass Court, Woodbridge, Ontario, Canada, L4L 3M6

[21] Appl. No.: 152,812

[22] Filed: Feb. 5, 1988

Related U.S. Patent Documents

Reissue of:

[64] Patent No.: 4,653,564
Issued: Mar. 31, 1987
Appl. No.: 801,414
Filed: Nov. 25, 1985

U.S. Applications:

[63] Continuation-in-part of Ser. No. 628,223, Jul. 6, 1984, abandoned.

[51] Int. Cl.[5] ..... E06B 9/36

[52] U.S. Cl. ..... 160/168.1; 160/177; 160/900

[58] Field of Search ..... 160/114, 172, 196.1, 160/107, 88, 84.1, 262, 120, 166.1, 168.1, 176.1, 177, 178.1, 900; 403/229, 161, 55, 402

[56] References Cited

U.S. PATENT DOCUMENTS

| | | | |
|---|---|---|---|
| 642,423 | 1/1900 | Brodie | 160/120 |
| 1,595,617 | 8/1926 | Raby | 248/266 |
| 2,254,566 | 9/1941 | Cornell | 403/229 X |
| 2,605,824 | 8/1952 | Armstrong | 160/168.1 |
| 2,635,686 | 4/1953 | King | 160/172 |
| 2,679,778 | 6/1954 | Krafft | 403/229 X |
| 2,799,333 | 7/1957 | Baroni | 160/166.1 X |
| 2,827,113 | 3/1958 | Graham | 160/172 |
| 3,190,346 | 6/1965 | Arena et al. | 160/172 |
| 3,280,891 | 10/1966 | Eldredge et al. | 160/172 |
| 3,389,738 | 6/1968 | Roth | 160/120 |
| 3,570,577 | 3/1971 | Bedrin | 160/193 X |
| 4,262,728 | 4/1981 | Debs | 160/172 X |
| 4,381,029 | 4/1983 | Ford et al. | 160/172 |
| 4,653,564 | 3/1987 | Marocco | 160/900 X |
| 4,655,010 | 4/1987 | Arquati | 160/66 X |

FOREIGN PATENT DOCUMENTS

| | | | |
|---|---|---|---|
| 3104922 | 4/1982 | Fed. Rep. of Germany | 160/900 |
| 1113641 | 5/1968 | United Kingdom | 160/107 |
| 1470533 | 4/1977 | United Kingdom | 160/166.1 |

*Primary Examiner*—Ramon S. Britts
*Assistant Examiner*—David M. Purol

[57] ABSTRACT

A blind apparatus comprising at least two tracks having adjacent ends meeting at a corner defined therebetween, the tracks defining two opposite ends remote from such corner, a rotation shaft for each track, a lead traveller in each track, moving along a lead traveller path of predetermined length from an open position at one end of the path to a closed position at the other end of the path, pluralities of travellers, forming groups, associated with respective lead travellers, each traveller having a rotatable slat shaft and being connected to a rotation shaft whereby upon rotation of the rotation shaft, the slat shaft may be rotated, adjacent travellers in the same group being connected by links, each lead traveller being connected to an adjacent traveller in its respective group by a further link, a [flexible] control element attachable to the lead travellers, and, a flexible coupling connecting adjacent rotation shafts at the corner, with all lead travellers being movable simultaneously along respective paths by the [flexible] control element. *Also disclosed is a corner junction member for joining the two lengths of track.*

31 Claims, 5 Drawing Sheets

100
102
111
112
108
104
116
114
110
106
136
132
146
138
154
130
144
152
134
138
142
150
146
144
158
140
156
148
158
140
166
160
162
164
156
154
152
148
162

BLIND ASSEMBLY

Matter enclosed in heavy brackets [ ] appears in the original patent but forms no part of this reissue specification; matter printed in italics indicates the additions made by reissue.

This application is a continuation-in-part of application Ser. No. 628,223, TRACK FOR BLINDS, filed July 6, 1984 now abandoned.

The invention relates to an apparatus for operating blinds, and in particular, the invention relates to an apparatus for operating vertical blinds around a corner.

Vertical blinds generally comprise a plurality of evenly spaced vertical slats, downwardly depending from travellers held in a horizontal track. The track is affixed to the ceiling or upper casement of a window. Each slat is rotatably attached to a single traveller which is slidable within the track. Commonly, a horizontal shaft connects all the travelers. Rotation of the shaft, through a suitable means in each traveller (such as a worm gear) causes the slats to rotate. Each traveller is connected to adjacent travellers by suitable movable connection means whereby, in one direction each traveller can be moved to contact another traveller, and, in an opposite direction the travellers move apart from each other. Suitable control means (such as cords, chains, or shafts) are provided whereby the travellers can be moved longitudinally along the track, and whereby the shaft can be turned to rotate the vertical slats. Generally, such controls are located at one end of the track.

In existing vertical blinds the track is straight. In order to have vertical blinds on both sides of a corner, for instance in a bay window or in a room having glass sides joining at corners, it is necessary to have a separate vertical blind arrangement along each window. Each blind must be operated individually, independently of the other blinds. Each blind requires its own control cords or shafts. These requirements add inconvenience and added expense to the vertical blind system. As well, the additional control cords or shafts detract from the aesthetic appearance of the window.

Where the two linear blind tracks meet, in the corner, there is a gap where the slats do not meet.

Where the lengths of track contain groups of travellers of different numbers, the travellers in all groups should be capable of being moved between fully open and fully closed positions simultaneously, by a single control.

It would therefore be advantageous to provide a vertical blind which could extend around corners and which would require only a single control cord or shaft. Furthermore, it would be also advantageous if such a blind could be devised to operate around a multiplicity of corners along different lengths of window. Furthermore, in certain applications it would also be advantageous if the blind apparatus could be oriented in any position including vertically, horizontally or in any other position.

With a view to overcoming the above disadvantages and to providing the above advantages, the invention comprises a blind apparatus comprising at least two tracks having adjacent ends meeting at a corner defined therebetween, the tracks defining two opposite ends remote from such corner, [a] *slat* rotation [shaft] *means* longitudinally located relative to each track, at least one lead traveller slidably received within each track, each lead traveller being movable along a lead traveller path of predetermined length from an open position at one end of the path to a closed position at the other end of the path; a plurality of travellers, forming a group, associated with each lead traveller, the travellers being slidably received within a track, each traveller having a rotatable slat shaft, each traveller being connected by suitable transmission means to one of the *slat* rotation [shafts] *means* whereby upon rotation of the *slat* rotation [shaft] *means*, the slat shaft may be rotated, adjacent travellers in the same group being connected by longitudinal control means attachable to the lead travellers, a rotation control attached to a *slat* rotation [shaft] *means*, and, flexible coupling means connecting adjacent *slat* rotation [shafts] *means* at the corner.

The invention achieves the above advantages *usefully* by providing a rotation shaft within the track. Each shaft is connected to an adjacent shaft around a corner by a suitable universal flexible coupling means, whereby rotation of one shaft will induce rotation in the other shaft. Furthermore, the lead traveller with the longest lead traveller path is *usefully* connected to a control cord. The control cord is also connected by a movable connection to the other lead travellers.

The connection means connecting the cord to respective lead travellers is such that all travelers in all groups will reach the fully opened or the fully closed position at the same time.

In one form, connectors are located at spaced points on the cord. In another form the connectors can be frictional sliding devices like a clutch providing a sliding grip.

*The invention also embraces a corner junction member for use in a blind apparatus as hereinbefore described and which corner junction member comprises first connector means interengageable with said first track at said corner, second connector means interengageable with said second track at said corner and, hinge means hingedly interconnecting said first and second connector means whereby said first and second tracks can be set at various angles to each other, said corner junction member being adapted to permit said first and second traverse drive means to be interconnected at said corner and to permit interconnection of said first and second slat-rotation means at said corner.*

IN THE DRAWINGS

DETAILED DESCRIPTION OF A SPECIFIC EMBODIMENT

Figure 1:
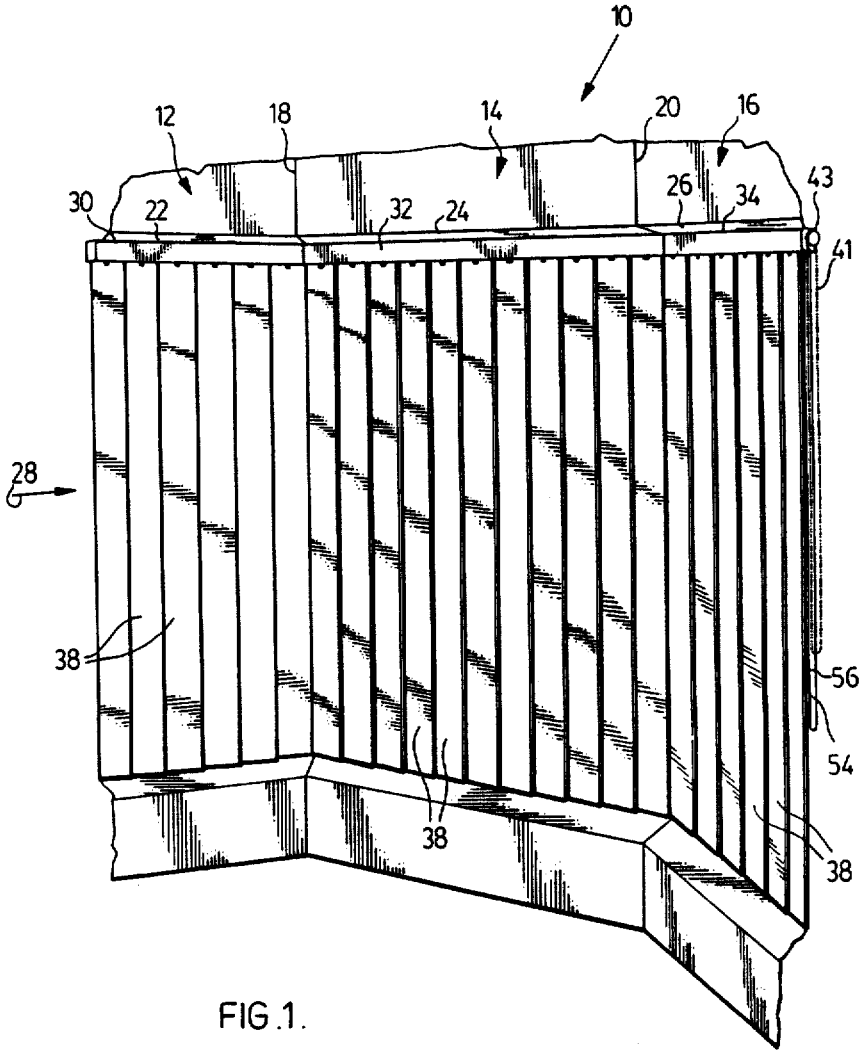
FIG. 1 is a perspective view of a bay window having a vertical blind apparatus according to the invention.

Referring to FIG. 1, there is illustrated a bay window indicated generally as 10. Bay window 10 comprises, in this illustration, left side 12, front side 14, and right side 16. Left side 12 is joined to front side 14 at corner 18. Similarly, front side 14 and right side 16 are joined at another corner 20. The sides 12, 14 and 16 may each define different lengths. As well, corners 18 and 20 may define different angles. The left side 12 of window 10 includes an upper casement 22. Similarly, sides 14 and 16 include upper casements 24 and 26 respectively. A vertical blind apparatus, according to the invention, indicated generally as 28, is affixed to and depends downwardly from upper casements 22, 24 and 26.

The invention is equally applicable to two sides, or four, or more.

Vertical blind apparatus 28 comprises horizontal tracks 30, 32 and 34 affixed respectively to upper casements 22, 24 and 26 and mitered together at corners 18 and 20. Slidably held within tracks 30, 32 and 34 are a plurality of travellers 36 (see FIG. 2). Rotatably attached to each traveller 36 is a downwardly depending slat 38. Slat 38 generally comprises an opaque material, so that when the vertical blind apparatus 28 is in a closed position light is prevented from entering bay window 10.

Travellers 36 slidably support slats 38. Furthermore, travellers 36 are interconnected by suitable movable link means 82, as discussed below, for longitudinally moving the travellers 36.

For convenient operation, free ends 54a and 56a of longitudinal control cords 54 and 56 depend from a free end of track 34, at one end of the blind. A suitable pulley (not shown) may be provided at such end to allow for smooth movement of cords 54 and 56. Cords 54 and 56 are connected, as disclosed herein, to a lead traveller (as, for example, lead traveller 36a or 36b in FIG. 3) in each track 30, 32 and 34. At an opposite end of vertical blind apparatus 28, cords 54 and 56 are joined together and, in fact, may be integral with each other. A suitable pulley (not shown) may be provided at such opposite end to allow for smooth movement of cords 54 and 56. The free ends 54a and 56a of cords 54 and 56, respectively, may be tied or otherwise connected together and, in fact, may be integral with each other.

Cords 54 and 56 may be pulled to move travellers 36 longitudinally within tracks 30, 32 and 34. Such longitudinal movement causes slats 38 to be drawn sideways between open and closed positions, as well as through intermediate positions therebetween.

In order to rotate slats 38, travellers 36 are each connected to a rotation shaft 40 (see FIG. 2), as described below. In order to rotate shaft 40 a suitable rotation control means, such as cord 41, is provided. Cord 41 depends from shaft 40, preferably at the same end of track 34 as free ends 54a and 56a of cords 54 and 56. Suitable means (such as pulley 43) is provided whereby movement of cord 41 will rotate shaft 40. It will be appreciated that other control means, such as chains, shafts or the like, may be used.

Rotation transmission means, typically worm gears (not shown), are incorporated in each traveller 36, and connected between the rotation shaft 40 and respective slats 38. Rotation of such worm gear rotates the slats 38.

Figure 3:
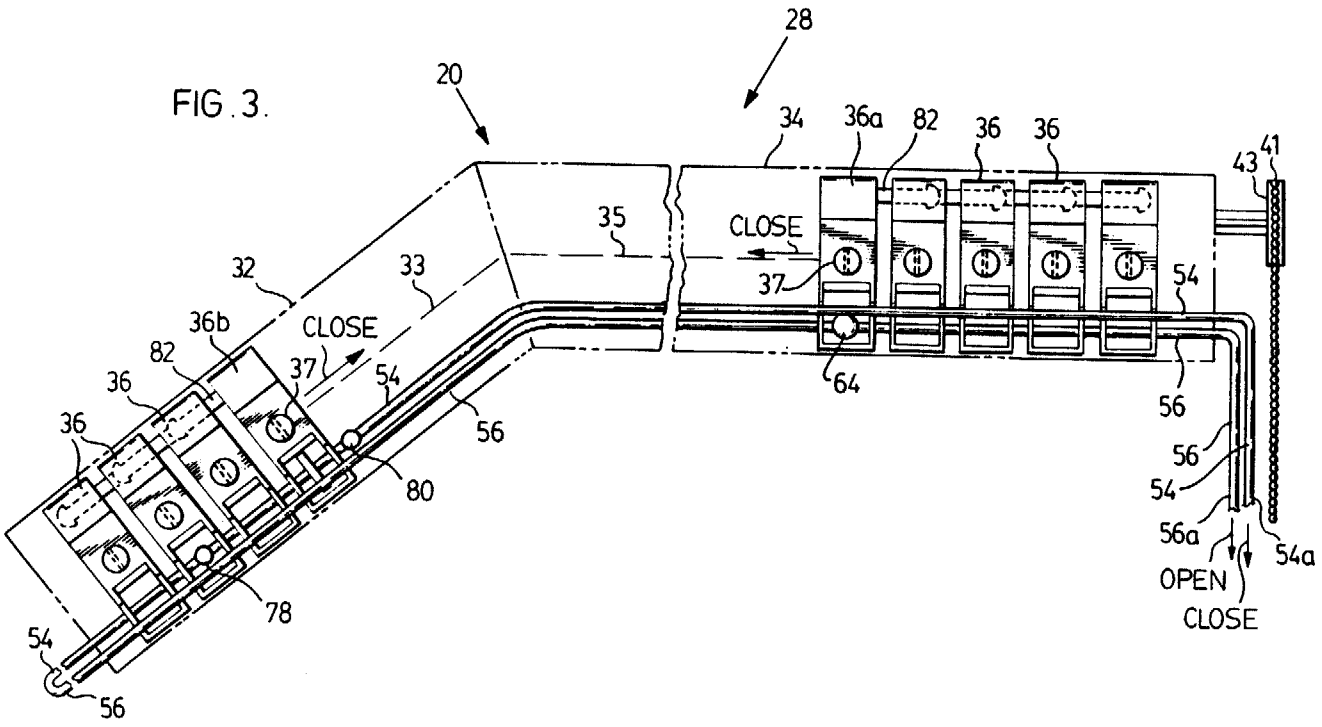
FIG. 3 is a bottom plan view of a blind showing the longitudinal control means.

Lead travellers 36a and 36b are movable along lead traveller paths 35 and 33, respectively (indicated in phantom in FIG. 3). Paths 35 and 33 have predetermined path lengths. In the illustrated embodiment, such path lengths correspond generally to the length of the tracks [32] *34* and [34] *32 respectively* (with an allowance for the length of the collapsed travellers 36 in the open position). However, the path lengths could be restricted to any fraction of the lengths of the tracks 32 and 34. Such restriction may be necessary, for example, in the situation where more than one lead traveller is provided in the same track (as in the case of a centre pull opening or multiple opening vertical blind apparatus).

Generally, the length of the path will depend upon the number of travellers in the track. The number of travellers will in turn depend on the width of the window (or space) to be covered by the slats.

The invention permits the movement of travellers arranged in groups of travellers of unequal numbers, in a manner to be described below.

It is not intended to restrict the scope of the invention to the particular window arrangement or track arrangement illustrated. Rather it is the intention that the scope of the invention cover any application of a vertical blind apparatus defining regular or rounded corners. Similarly, it is not intended to restrict the scope of the invention to the particular track and traveller assemblies disclosed. Rather, it is the intention that the scope of the invention include any track design and traveller design.

Figure 2:
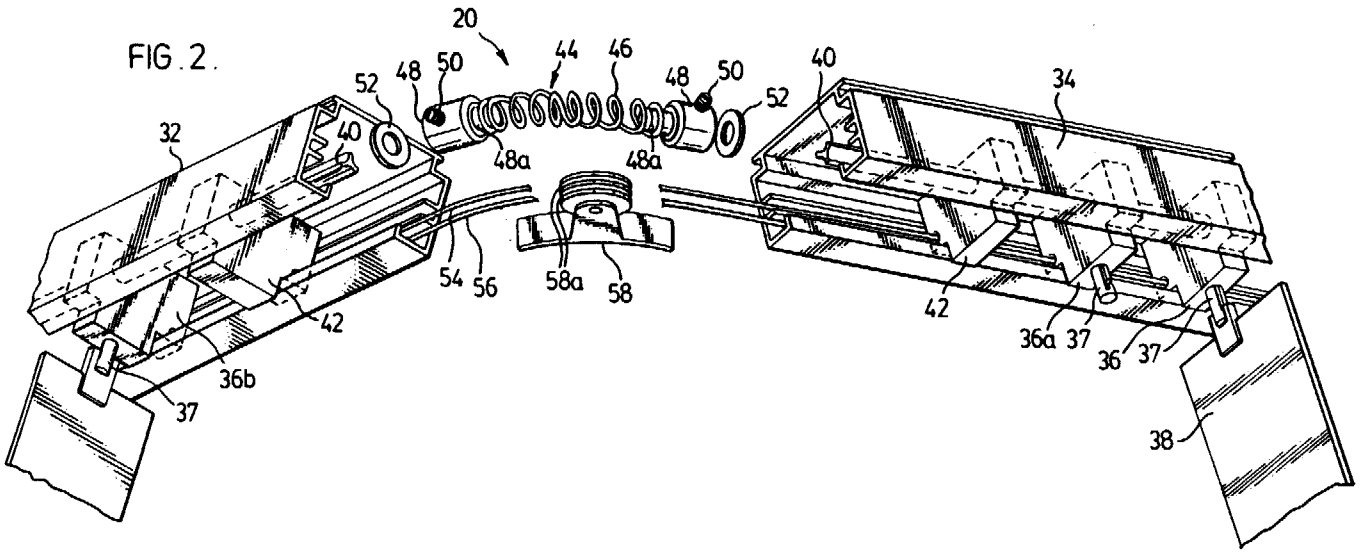
FIG. 2 is an exploded perspective view, partly cutaway, illustrating one embodiment of a blind at a corner.

Referring to FIG. 2, there are illustrated tracks 32 and 34 meeting at a corner, indicated generally as 20. Tracks 32 and 34 are affixed by any suitable means to upper casements 24 and 26, respectively (see FIG. 1). Travellers 36 are slidably held within tracks 32 and 34. Each traveller 36 includes a rotatable slaft shaft 37. A slat 38 is affixed to each slat shaft 37.

A *respective* rotation shaft 40 extends along the length of each track 32 and 34 from one end to the other. [Shaft] *The shafts* 40 [is] *are* rotatably supported by a suitable support means, such as bearing blocks 42 affixed at each end of tracks 32 and 34. Bearing block 42 defines a suitable hole allowing shaft 40 to extend therethrough. Similarly, each traveller 36 defines a suitable opening allowing shaft 40 to pass therethrough. A suitable gear or other transmission means known in the art (not shown) is included in each traveller 36 and is adapted to cooperate with shaft 40, whereby rotation of shaft 40 will induce each slat shaft 37 to rotate. Rotation of slat shafts 37 in unison will cause slats 38 to either open or close, as desired. In order to rotate shaft 40, [a suitable] pulley 43, or other means, may be attached at one end of shaft 40 and may be operable by a suitable cord, chain or other means (see cord 41 in FIG. 1).

Adjacent shafts 40 are connected together at corner 20 by flexible coupling means 44. The bearing blocks 42 are arranged at either end of the flexible coupling means 44 to locate the ends of the shafts 40 adjacent the flexible coupling means 44. In the illustrated embodiment, flexible coupling means 44 comprises a cylindrical helical spring 46 affixed to collars 48 at each end. Collars 48 in turn are affixed by suitable means, such as set screw 50, to each shaft 40. For protection and for ease of rotation, washers 52 may be inserted in place between collars 48 and bearing blocks 42. Each collar 48 defines a boss 48a extending therefrom in order to assist in affixing spring 46 to collars 48. The spring 46 may be wrapped around and affixed to the bosses 48a by suitable means.

Other flexible coupling means may be used. For example, a spring, a universal joint, or a series of universal joints, a flexible hose (such as a rubber hose) or a flexible cable (such as is used in a speedometer cable) may be used.

As described below, cords 54 and 56 are used to move travellers 36 longitudinally within tracks 32 and 34 in order to open and close the vertical blind apparatus 28. In order to allow cords 54 and 56 to pass without restriction around corner 20, a dual pulley arrangement 58 is affixed between tracks 34 and 32 at corner 20. Dual pulley 58 includes two pulley wheels 58a, rotatable in opposite directions. Cord 54 lies within the groove of one such pulley wheel 58a and cord 56 lies within the groove of the other pulley wheel 58a.

In other embodiments it may not be necessary to use a dual pulley 58. For instance, a smooth rounded plate, effectively rounding off corner 20 or a bent hollow tube may be found suitable. However, it has been found that upon occasion such plates or tubes may cause cords 54 and 56 to bind together, thereby interfering with the smooth functioning of the vertical blind apparatus. It has been found that the dual pulley arrangement is preferable.

Referring to FIG. 3, a schematic plan view of tracks 32 and 34 meeting at corner 20 is provided. The outline of tracks 32 and 34 is shown in phantom. Groups of travellers 36 are constrained to move within tracks 32 and 34. As illustrated here, track 34 has a group of five travellers, and track 32 has a group of four travellers. As a result lead traveller path 35 in track 34 is somewhat longer than lead traveller path 33 in track 32.

In order to allow the vertical blind apparatus 28 to open and close evenly, even though paths 33 and 35 are of different lengths, cords 54 and 56 are provided with movable connectors for connection to the lead travellers. Cords 54 and 56 are integral with each other, or tied together, at one end. At the other end the free ends 54a and 56a of cords 54 and 56 depend downwardly. A human operator may open and close the blinds by pulling on the free ends 54a and 56a of cords 54 and 56. Cord 56 is connected to the lead traveller 36a in track 34, having the longest path, in this case path 35. Cord 54 is connected, as described below, to the lead traveller 36b in path 33, the shorter path.

Figure 4:
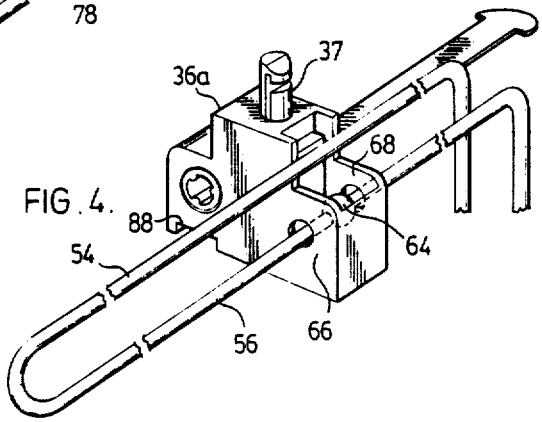
FIG. 4 is a perspective view of a lead traveller of one embodiment.

Referring to FIG. 4, lead traveller 36a is illustrated. One means of attaching cord 56 to traveller 36a is to attach traveller engagement means 64 to cord 56 between two panels 66 and 68 of traveller 36a. Panels 66 and 68 define suitable openings allowing cord 56 to pass therethrough. When cord 56 is pulled in one direction or the other, engagement means 64 will engage and abut against either panel 66 or panel 68, thereby causing lead traveller 36a to move. Engagement means 64 may comprise a spherical ball which is crimped about cord 56. Other means of attaching cord 56 to traveller 36a may be used. For example, cord 56 may simply be tied to or wrapped around a portion of traveller 36a.

Figure 5:
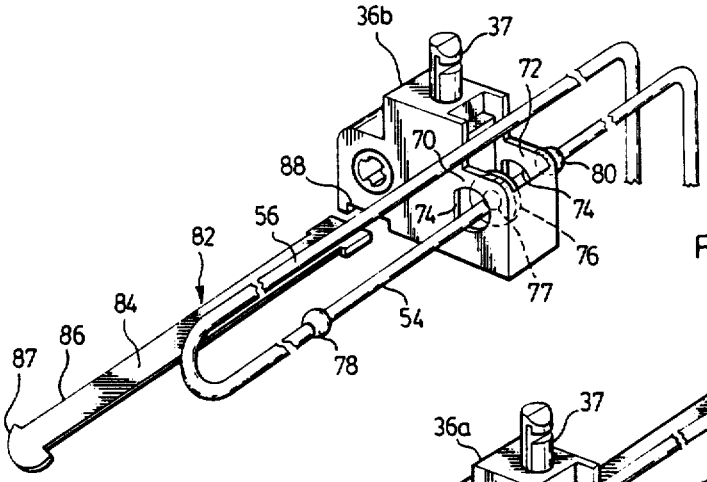
FIG. 5 is a perspective view of a second lead traveller according to one embodiment.

Referring to FIG. 5, lead traveller 36b is shown. Traveller 36b may include panels 70 and 72, each panel 70 and 72 defining an opening 74 therein. Cord 54 passes through openings 74. Between panels 70 and 72 a washer 76 may be loosely arranged around cord 54. The outer diameter of washer 76 is sufficiently large that washer 76 cannot pass through openings 74. The blind *is shown* in the fully open position, with cord 54 being pulled taut and about to commence closing vertical blind apparatus 28. A first traveller engagement means 80 is affixed to cord 54 adjacent panel 72. Similarly, a second engagement means 78 [78] is affixed to cord 56, but is spaced apart from engagement means 80 by an amount about equal to the difference in length between paths 35 and 33. Engagement means 78 and 80 may comprise spherical balls or beads which are crimped about cord 54. The diameters of engagement means 78 and 80 are sufficiently small to pass through openings 74 in panels 72 and 70, but are also sufficiently large that they may not pass through a central aperture 77 of washer 76.

Cords 54 and 56 are only attached or attachable to the lead travellers 36a and 36b. Cords 54 and 56 pass around or through the other travellers 36 (at suitable openings provided therein) and are not attached or attachable thereto.

Lead travellers 36a and 36b are each connected to an adjacent traveller 36 (which in turn is connected to a train of subsequent slider blocks 36) by suitable link means 82. Link means 82 are movable relative to the travellers whereby when lead traveller 36a or 36b is moved a predetermined distance in the closing direction, such traveller 36a or 36b will commence pulling the subsequent traveller 36. When the lead traveller 36a or 36b is moved in an opening direction, the link means 82 is movable to allow the lead traveller 36a or 36b to approach and abut against an adjacent traveller 36. Thereafter further movement of lead [ttaveller] *traveller* 36a or 36b will also cause travellers 36 to close up as well. Subsequent travellers 36 are either opened or closed in corresponding fashion by interconnecting link means 82 linking adjacent travellers 36.

In the illustrated embodiments, link means 82 comprises a stiff strip 84 having a shank 86 and a wide head 87. Each traveller 36 defines an aperture 88. Strip 84 of an adjacent traveller 36 extends through aperture 88. The shank 86 is slidable within aperture 88. The head 87 may be inserted through aperture 88 from one direction, but cannot be removed therefrom in an opposite direction.

In operation, for ease of description it is assumed that the vertical blind apparatus 28 commences in the open position (as shown in FIG. 3). In order to close the vertical blind apparatus 28, the human operator pulls cord 54. Cord 54 in turn commences to pull cord 56 and lead traveller 36a toward the closed position. Cords 54 and 56 move in opposite directions. Dual pulley arrangement 58 allows cords 54 and 56 to move in opposite directions relative to each other around corner 20 without binding.

Cord 54 moves loosely through apertures 74 in lead traveller 36b, and at first the lead traveller 36b remains in the fully open position.

As lead traveller 36a reaches a predetermined spaced apart distance from a subsequent traveller 36, the *link or* connector means 82 between such travellers 36a and 36 commences to pull an adjacent traveller 36 toward the closed position.

As cord 54 continues to move through apertures 74 and 77, of lead traveller 36b, a point is reached where traveller engagement means 78 passes through the first opening 74 and contacts washer 76. Thereafter, washer 76 is pulled toward panel 72. Washer 76 then abuts against panel 72. At this position, lead travellers 36a and 36b both have the same distance to travel in order to reach the fully closed position.

As cord 54 is pulled further towards the closed position, both lead travellers 36a and 36b move toward the closed position. Both travellers 36a and 36b pull, by link means 82, a group or train of travellers 36 therebehind.

At the fully closed position, travellers 36 are spaced apart along the length of tracks 32 and 34 according to the lengths of the various link means 82. In order to close the slats 38, [a] rotation shaft 40 is rotated by the suitable rotation control means provided (but not shown in detail). For example, cord 41 may be pulled to rotate pulley 43 and to rotate shaft 40. As one shaft 40 rotates, the flexible coupling means 44 will also rotate therewith, causing the other shaft 40 to also rotate. In such fashion, the rotation of one shaft 40 is transmitted around corner 20. The rotation of shafts 40 causes the rotation of slat shafts 37 and slats 38 to the closed position through the suitable transmission means (not shown) provided in each traveller 36. The vertical blind apparatus 28 according to the invention is now in the fully closed position.

In order to open the blinds the rotation of shafts 40 is reversed.

Subsequently, when the slats 38 are in the open position, cord 56 is now pulled to open the vertical blind apparatus 28. The pulling of cord 56 causes engagement means 78 to be released from contact with washer 76. Furthermore, because cord 56 is tied to or integral with cord 54, lead traveller 36a commences to move toward the open position. As lead traveller 36a continues to move toward the open position, link means 82 between traveller 36a and an adjacent traveller 36 telescopes, or otherwise allows lead traveller 36a to move closer towards such adjacent traveller 36.

As cord 56 continues to be pulled through lead traveller 36b, engagement means 78 passes outwardly through opening 74 in panel 70. Lead traveller 36b, however, remains in the fully closed position. Lead traveller 36a eventually will contact and push adjacent traveller 36, and thereafter will cause both travellers 36a and 36 to move toward the open position.

Eventually, engagement means 80 will pass through opening 74 in panel 72 in traveller 36b. Engagement means 80 will continue to be pulled until it contacts washer 76 and thereafter will move washer 76 toward panel 70, until washer 76 abuts against panel 70. At such position, lead traveller 36b will commence movement toward the open position. At such position, both lead travellers 36a and 36b will have to travel an equal distance to the fully open position.

As lead traveller 36b continues to move toward the open position, a connector means 82 between traveller 36b and an adjacent traveller 36 will collapse or otherwise allow traveller 36b to move closer to traveller 36. Eventually, traveller 36b will contact and push traveller 36, and thereafter, cord 56 will operate to pull both travellers 36b and 36 toward the open position.

In such fashion, all of travellers 36 close up against each other and the blind returns to the fully open position.

It will be appreciated that if the closing direction of track 34 were the same as that of track 32, engagement means 78 and 80 would be attached to cord 56. Furthermore, cord 56 would pass through openings 74 in panels 70 and 72 and through opening 77 in washer 76.

Similarly, the traveller engagement means 64, 78 and 80 will be attached to cords 54 and 56 depending on the specific desired vertical blind arrangement. By suitably positioning such engagement means 64, 78 and 80 and by providing suitable lead travellers, it is possible to design any vertical blind arrangement, such as normal opening, inverted opening, centre pull opening, inverted centre pull opening, multiple opening and double centre pull opening apparatuses as well as other designs.

In further embodiments, a vertical blind apparatus may include a multiplicity of corners and tracks of different lengths. In such an apparatus, cord 54 is fixed to a lead traveller having the longest path length. There may conceivably be more than one lead traveller having the same, but longest, path length. Cord 54 is also fixed to such other lead travellers, as well. Pairs of engagement means are attached to either cord 54 or 56, depending on the desired direction for opening and closing the vertical blind apparatus, on each side of the other lead travellers, having other shorter paths. The distance between the members of each pair of engagement means is equal to the difference in length between such other path and the longest path. The engagement means in each pair is specifically positioned, as described above.

In a further embodiment, if all lead traveller paths have the same length, the cords 54 and 56 are simply fixed to the lead travellers. They may, for example, be attached by means shown in FIG. 4 or they may simply be tied to or wrapped around a portion of the lead traveller.

In a further embodiment, a lead traveller may have a design different from other travellers. The embodiment of FIGS. 3 to 5 illustrates lead travellers identical to other travellers. Such an arrangement is convenient for the manufacture of the blind apparatus. However, in certain instances a lead traveller with special different characteristics may be desired.

Figure 6:
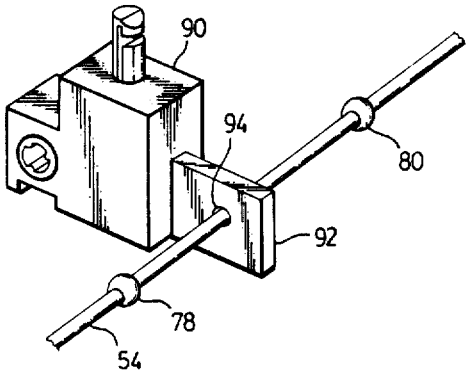
FIG. 6 is a perspective view of an alternate lead traveller of a further embodiment.

FIG. 6 illustrates one such alternate embodiment for a lead traveller 90. Lead traveller 90 defines only one panel 92 which allows cord 54 to pass therethrough at an opening 94. Engagement means 78 and 80 are unable to pass through opening 94. Engagement means 78 and 80 are separated by a distance about equal to the difference in lengths of the longest traveller path and the path of lead traveller 90 plus the thickness of panel 92. Lead traveller 90 may not include a slat shaft and may not have a slat affixed thereto. Furthermore, lead traveller 90 may not have a collapsible connection means connecting it to an adjacent traveller 36. Rather, lead traveller 90 may be rigidly fixed in close proximity to an adjacent traveller 36.

According to a further embodiment the use of fixed connectors on beads 64, 78 and 80 may be dispensed with.

Instead, the cords may be gripped by clutch devices associated with the lead travellers in each group.

These devices provide a form of sliding frictional grip on the cord so that the locations of the lead travellers can be self-adjusting.

Figures 7, 8A, 8B:
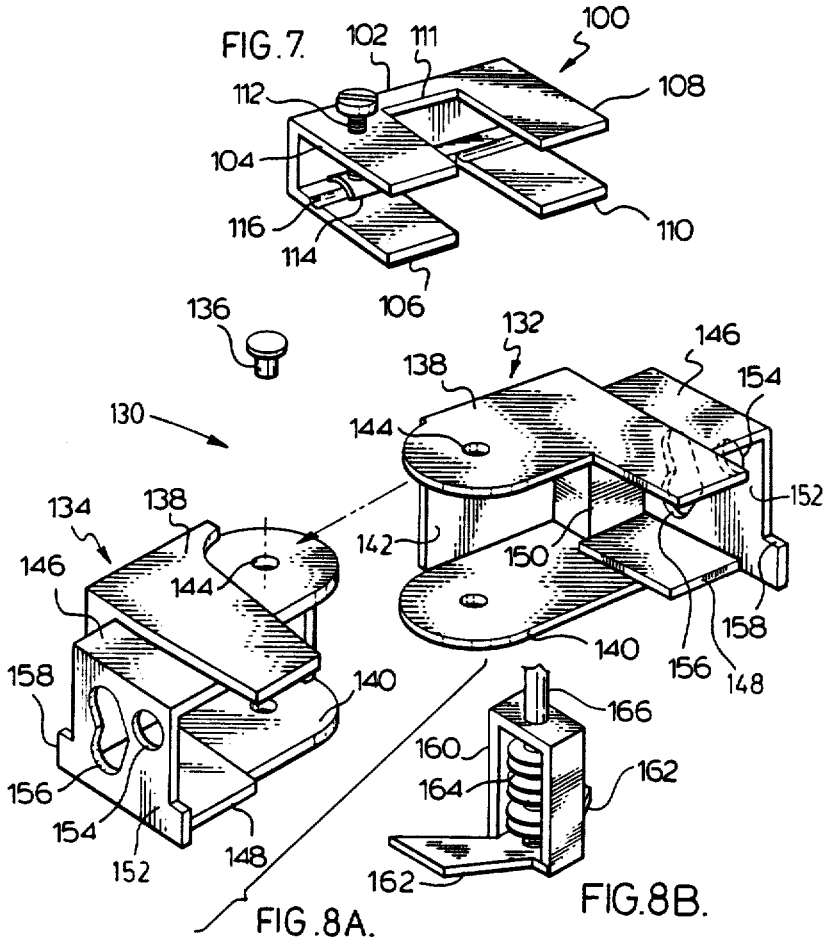
FIG. 7 is a perspective view of a further embodiment of sliding clutch.
FIGS. 8a and 8b are exploded, and perspective illustrations of a further embodiment for joining the tracks at the corner.

One form of such a clutch device is shown in FIG. 7.

It will be seen to comprise a generally channelshaped body portion 100 having a back portion 102. Side walls 104, 106 and 108, 110 extend from back portion 102. A generally rectangular notch *111* is formed between walls 104 and 108, and 106 and 110 respectively, for reasons to be described.

An adjustment screw 112 is mounted in wall 104, and carries a pressure shoe 114. A guide groove 116 is formed in [wall] *walls* 106 *and 110*. Groove 116 and shoe 114 register with one another so as to embrace a cord on opposite sides.

By suitable adjusting the screw 112, a pressure can be applied to a cord between shoe 114 and groove 116.

This pressure can be regulated so as to produce the desired amount of friction.

Other forms of clutch devices can be provided. For example, a clutch device could simply be an opening of a restricted size, in a traveller, or in a device such as a connector bead 64, 78 or 80, or even a washer 76.

All could be made to fit on the cord with a frictional sliding grip.

In operation in this embodiment, all lead travellers would start to move in unison. However those travellers in small groups would come to rest earlier than those in larger groups. The clutch devices would then allow the cords to slip so that the longest lead traveller could continue to move.

The clutch 100 is so designed that it can be used with various different makes of traveller. With one make of traveller, the notch 111 between can receive the lead traveller within it. In this way, movement of the cord in either direction will cause the lead traveller to move.

The clutch 100 can be associated in other ways with other forms of travellers which are now in use, and which form no part of this disclosure being in any event [wellknown] *well known* in the art.

In a further embodiment, an additional horizontal track may be provided at the bottom of the vertical blind apparatus. Control cords may be provided to operate travellers in both upper and lower tracks simultaneously. By using opposed pairs of tracks to support the slats, the blind apparatus may be supported in any position, including a vertical position, a horizontal position or any position therebetween.

In accordance with a further embodiment the corners of the tracks may be joined, by means of the corner insert member illustrated generally in FIGS. 8a and 8b.

The corner insert member is indicated generally as 130, and comprises right and left hand body members 132 and 134 hinged together by suitable hinge pin means such as 136.

The body member 132 will be seen to comprise upper and lower hinged walls 138, 140, in spaced apart parallel planes, and joined by a junction wall 142.

Walls 138 and 140 define hinge holes 144.

At the opposite ends of walls 138, 140, upper and lower track connector walls 146 and 148 extend outwardly. Walls 146–148 are located in parallel spaced apart planes, being offset inwardly with respect to the planes of walls 138–140 for reasons to be described. A side junction wall 150 extends between walls 146–148, which lies in a plane offset inwardly with respect to side wall 142 of body 132.

An end wall 152 extends between the ends of walls 146, 148 and 150.

A cord guide opening 154 is formed in wall 152, and a rod guide opening 156 is also formed in wall 152.

A pair of locating fingers 158 extend from opposite sides of wall 152.

Body 134 defines the same components, and these are therefore given the same numbers as in the case of body 132. The only exception is that the walls 138–140 are formed so as to interfit with one another in the two bodies 132–134, whereby to overlap and form a hinge.

In order to guide the cords, around the corner, a corner guide frame 160 is provided, having two fastening flanges 162, extending from one end thereof at an obtuse angle.

Pulleys 164 are mounted on a common shaft 166 within frame 160.

In operation, where it is desired to join two pieces of track at a corner, the ends of the two pieces of track are cut square, and the two pieces of track are then slid onto the walls 146, 148, 150 on each of bodies 132 and 134.

The locating members 158 fit within portions of the track.

The walls 138, 140 will then be left extending out of the two ends of the track.

The frame 160 is then introduced into position and the portions of track are then swung until the correct angle is located. The two flanges 162 are secured permanently to the walls 138 on the bodies 132, 134 by means of screws (not shown) or other suitable fastening means.

The control cords and the control shaft and its flexible junction member are then introduced through the openings in the walls 152, and are assembled together, with the control cords running around the pulleys 164.

If desired, a corner trim plate (not shown) may be attached between the two portions of track to cover the corner member 130 if desired.

It will of course be appreciated that while the corner junction member 130 is indicated as two separate parts hinged together by pin means, in accordance with well-known plastic forming techniques, plastic structures can be formed of what is known as a "self-hinge" being a flexible portion of plastic formed integrally with the plastic structure by means of which two portions may be hinged or swung relative to one another.

Clearly, such a well-known forming technique could be used in the present case, with only minor modifications.

The foregoing is a description of a preferred embodiment of the invention which is given here by way of example only. The invention is not to be taken as described, but comprehends all such variations thereof as come within the scope of the appended claims.

I claim:

1. A blind apparatus comprising:

at least two tracks having adjacent ends meeting at a corner defined therebetween, the tracks defining two opposite ends remote from such corner;

at least one corner junction member adapted to form said corner;

connection means on said corner junction member interengageable with said adjacent ends of said tracks;

an angle formation in said junction member whereby said tracks are located at an angle to one another;

[a] *first and second slat* rotation [shaft] *means extending* longitudinally [located] relative to [each track] *respective ones of said tracks;* support means for supporting said *slat* rotation [shafts] *means;* a plurality of travellers, forming at least two groups, said travellers being slidably received within respective tracks, each traveller having a rotatable slat shaft, each traveller in each said group being connected to a respective one of said *slat* rotation [shafts] *means* for rotation of said slat shafts, adjacent travellers in the same group being connected to one another;

[flexible elements] *traverse drive means* engageable with said groups of travellers and operable to move said travellers along *respective ones of* said tracks between open and closed positions;

rotation control means connected to a said *slat* rotation [shaft] *means*, and, flexible coupling means connecting adjacent *slat* rotation [shafts] *means* adjacent said corner.

2. A blind apparatus as claimed in claim [1] *25* wherein said flexible coupling means comprises:

a helical spring, and, collar means attached to each end of said spring, each collar means being affixed to a respective rotation shaft.

3. A blind apparatus as claimed in claim [1] *26* wherein a guide means is provided at said corner, whereby said flexible element may be supported around said corner.

4. A blind apparatus as claimed in claim 3 wherein a pulley is provided at said one end of said one track to receive said flexible element.

5. A blind apparatus as claimed in claim 4 including:

a lead traveller in each said group of travellers, at least one main lead traveller moving along a path of a predetermined length between open and closed positions, and others of said lead travellers moving along paths of a length less than said predetermined length, wherein a said flexible element is attached to said main lead traveller to move the same along said lead traveller path, and wherein slidable lead traveller engagement means are attached to each said other lead traveller, whereby to allow said flexible element to move the full length of said longest lead traveller path.

6. A blind apparatus as claimed in claim 5 wherein each engagement means for said other lead travellers comprises a first bead affixed to said flexible element and wherein each said other lead traveller defines two parallel spaced apart panels defining first openings therethrough, said flexible element extending through the first openings, said openings having sufficient width to admit said first beads therethrough, and including a washer having a central aperture through which said flexible element extends, said washer being supported by said flexible element between said panels, said central aperture having insufficient width to allow said first beads to pass therethrough.

7. A bling apparatus as claimed in claim 6 wherein said attachment means includes a second bead affixed to said flexible element, said second bead having a width greater than that of said openings in said panels.

8. A blind apparatus as claimed in claim 1 wherein a downwardly depending slat is attached to each slat shaft.

9. A blind apparatus as claimed in claim 1 wherein said corner junction member comprises insert portions adapted to be inserted into adjacent ends of said tracks, and hinge means joining said insert portions, whereby said tracks can be adjusted to different angles.

10. A blind apparatus as claimed in claim 9 wherein there are two said insert portions each having hinge wall means forming an integral structure.

11. A blind apparatus as claimed in claim [9] *25* including bearing means in said junction member for receiving said rotation shafts.

12. A blind apparatus as claimed in claim [9] *26* including guide rollers in said junction member for guiding said flexible elements.

13. A blind apparatus as claimed in claim [1] *26* including traveller engagement means slidable along said flexible elements.

14. A blind apparatus as claimed in claim 5 wherein said engagement means comprises a body member, and frictional gripping means in said body member, adapted to make a sliding frictional grip on said flexible elements, said body member being connectable with a respective one of said other lead travellers whereby to move them a predetermined distance, and thereafter when said other lead travellers are at rest, said flexible elements will slide through said gripping means, to permit said main lead traveller to move along its said longest path.

15. A blind apparatus as claimed in claim 1 wherein there are three said tracks, meeting at two corners, and including two said [corner] *angle* formations.

16. A blind apparatus comprising:

at least two tracks having adjacent ends meeting at a corner defined therebetween, the tracks defining two opposite ends remote from such corner;

a relatively rigid rotation shaft longitudinally located relative to each track;

support means affixed to each track for supporting respective rotation shafts;

at least one lead traveller slidably received within each track, each said lead traveller being constrained to move along a lead traveller path of predetermined length within its respective said track from an open position at one end of said path to a closed position at the other end of said path;

a plurality of further travellers, formin at least two groups, a said group being associated with a respective said lead traveller, all said travellers being slidably received within respective said tracks, each said traveller having a rotatable slat shaft, each said traveller being connected by suitable transmission means to a respective one of said rotation shafts whereby upon rotation of said rotation shafts, said slat shafts may be rotated, adjacent travellers in the same said group being connected by a connection means, each said lead traveller being connected to an adjacent said traveller in its respective said group by a further connection means;

[a flexible element] *traverse drive means* engageable with said lead travellers and operable to move [all] said lead travellers simultaneously along said tracks between open and closed positions;

rotations control means attached to one of said rotation shafts, and, flexible coupling means connecting adjacent rotation shafts at said corner.

17. A blind apparatus as claimed in claim 16 wherein said flexible coupling means comprises:

a helical spring, and, collar means attached to each end of said spring, each collar means being affixed to a respective shaft.

18. A blind apparatus as claimed in claim [16] *27* including guide means at said corner, for guiding said flexible element.

19. A blind apparatus as claimed in claim 18 wherein said flexible element is attached to each lead traveller constrained to move along a longest lead traveller path, and wherein lead traveller engagement means are adjustably attached to said flexible element adjacent each other lead traveller, and engage the same.

20. A blind apparatus as claimed in claim 19 wherein said lead traveller engagement means comprises a first bead affixed to said flexible element and wherein each said other lead traveller defined two parallel spaced apart panels defining first openings therethrough, said flexible element extending through said first openings, said first openings having sufficient width to admit said first beads therethrough, and including a washer, having a central aperture through which said flexible element extends, said washer being supported between said panels, said central aperture having insufficient width to allow said first beads to pass therethrough, and including a second bead affixed to said flexible element, said second bead having a width greater than that of said first openings in said panels.

21. A blind apparatus as claimed in claim 16 wherein a downwardly depending slat is attached to each slat shaft.

22. A blind apparatus as claimed in claim 16 including a corner junction member, adapted to form a corner between two adjacent ends of track, said corner junction member comprising portions adapted to be connected to adjacent ends of said tracks, and angle means joining said portions, whereby said tracks can be set at an angle to one another.

23. A blind apparatus as claimed in claim 19 wherein said lead traveller engagement means comprises a body member, and frictional gripping means in said body member adapted to make a sliding frictional grip on said flexible element, whereby said body member may move a predetermined distance, and thereafter when its respective said lead traveller is at rest, said flexible element will slide through said gripping means.

24. A blind apparatus as claimed in claim 16 wherein there are three said tracks meeting at two corners.

*25. A blind apparatus as claimed in claim 1 and in which said first and second slat-rotation means comprise first and second rotation shafts.*

*26. A blind apparatus as claimed in claim 25 and in which said traverse drive means comprises flexible elements engageable with said groups of travellers.*

*27. A blind apparatus as claimed in claim 16 and in which said traverse drive means comprises a flexible element engageable with said lead travellers.*

*28. A blind track assembly comprising:*

*at least two lengths of blind track, meeting at a corner;*

*blind suspension means supported by said at least two lengths of track;*

*blind control means extending along said at least two lengths of track;*

*a corner junction member at said corner, said corner junction member, in turn, comprising:*

*first connector means interengageable with a first one of said tracks at said corner;*

*second connector means interengageable with a second one of said lengths of track;*

*hinge means interconnecting said first and second connector means whereby said lengths of track may be set at an angle to one another, and,*

*guide means on said corner junction member for guiding said blind control means therearound.*

*29. A blind track assembly as claimed in claim 28, wherein said blind control means is rotatable, and including bearing means in said corner junction member for supporting said blind control means.*

*30. A blind track assembly as claimed in claim 29 including blind control means in both said lengths of track, and including flexible connector means extending between said first and second blind control means.*

*31. A blind track assembly comprising:*

*at least two lengths of blind track, meeting at a corner;*

*blind suspension means supported by said at least two lengths of track;*

*blind control means extending along said at least two lengths of track;*

*a corner junction member at said corner, said corner junction member, in turn, comprising:*

*first connector means interengageable with a first one of said tracks at said corner;*

*second connector means interengageable with a second one of said lengths of track;*

*hinge means interconnecting said first and second connector means whereby said lengths of track may be set at an angle to one another, and,*

*rotatable blind control means in both said lengths of track, and including rotatable connector means extending between respective said rotatable blind control means.*

* * * * *